(12) United States Patent
Uno

(10) Patent No.: US 8,908,094 B2
(45) Date of Patent: Dec. 9, 2014

(54) STANDBY PICTURE DISPLAYING METHOD, MOBILE TERMINAL AND CONTROL PROGRAM

(75) Inventor: Hiroyuki Uno, Tokyo (JP)

(73) Assignee: Lenovo Innovations Limited (Hong Kong), Quarry Bay (HK)

( * ) Notice: Subject to any disclaimer, the term of this patent is extended or adjusted under 35 U.S.C. 154(b) by 1081 days.

(21) Appl. No.: 12/682,983

(22) PCT Filed: Oct. 16, 2008

(86) PCT No.: PCT/JP2008/068800
§ 371 (c)(1),
(2), (4) Date: Apr. 14, 2010

(87) PCT Pub. No.: WO2009/051205
PCT Pub. Date: Apr. 23, 2009

(65) Prior Publication Data
US 2010/0225812 A1    Sep. 9, 2010

(30) Foreign Application Priority Data

Oct. 16, 2007  (JP) .................................. 2007-269392

(51) Int. Cl.
*H04N 5/44* (2011.01)
*H04N 5/445* (2011.01)
*H04N 21/458* (2011.01)
*H04N 21/414* (2011.01)
*H04N 7/16* (2011.01)
*H04N 21/81* (2011.01)
*H04N 21/2187* (2011.01)
*H04M 1/725* (2006.01)

(52) U.S. Cl.
CPC ............... *H04N 5/44* (2013.01); *H04N 21/458* (2013.01); *H04M 1/72522* (2013.01); *H04N 21/41407* (2013.01); *H04N 7/163* (2013.01); *H04N 21/8153* (2013.01); *H04N 21/2187* (2013.01)
USPC ........... 348/553; 348/564; 348/552; 348/563; 348/725; 348/729

(58) Field of Classification Search
USPC ................. 348/553, 552, 563, 564, 725, 729; 455/556.1, 556.2
See application file for complete search history.

(56) References Cited

U.S. PATENT DOCUMENTS 8,200,279 B2 * 6/2012 Ki et al. ..................... 455/556.1

FOREIGN PATENT DOCUMENTS

| EP | 1715680 A1 | 10/2006 |
|---|---|---|
| JP | 2005-079920 | * 3/2005 |
| JP | 2005-079920 A | 3/2005 |
| JP | 2005-277867 A | 10/2005 |
| JP | 2006-094361 A | 4/2006 |

OTHER PUBLICATIONS

International Search Report for PCT/JP2008/068800, mailed Dec. 9, 2008.
Extended European search report for EP08840563 dated Aug. 16, 2012.

* cited by examiner

*Primary Examiner* — Jefferey Harold
*Assistant Examiner* — Jean W Desir
(74) *Attorney, Agent, or Firm* — Sughrue Mion, PLLC

(57) ABSTRACT

A TV receiver is activated at the time of a transition to a standby condition of a mobile terminal (100) with the TV receiver, data on a standby screen saved beforehand is synthesized with data on a predetermined image, and the synthesized image is displayed. Thereafter, the predetermined image in the synthesized image is switched to, at a predetermined timing, a real-time TV image received by the TV receiver and the real-time TV image is displayed. Accordingly, an image is displayed on the standby screen even in a blank period that a TV image cannot be displayed well because of a preparation for displaying a TV image right after the transition to the standby condition, thereby promoting utilization of a TV broadcasting through the mobile terminal.

28 Claims, 9 Drawing Sheets

STANDBY PICTURE DISPLAYING METHOD, MOBILE TERMINAL AND CONTROL PROGRAM

This application is the National Phase of PCT/JP2008/068800, filed on Oct. 16, 2008, which is based on Japanese Patent Application No. 2007-269392 filed on Oct. 16, 2007. The specification, claims, drawings of that Japanese application are entirely incorporated herein by reference.

TECHNICAL FIELD

The present invention relates to the TV (television) display function of a mobile terminal, and more particularly, a standby screen display method for a mobile terminal having a TV receiver, the mobile terminal, and a control program.

BACKGROUND ART

One Seg mobile terminals or the like having a TV function become widespread, but in an actual condition, small percentage of people actively watch TV using such a mobile terminal.

Patent Literature 1 discloses a mobile terminal which can receive a TV broadcasting and can display broadcasting information recorded beforehand on a standby screen.

According to the mobile terminal disclosed in Patent Literature 1, it is possible to set a timing, such as a time interval or a time when a user starts recording, and a display scheme, a broadcasting channel is automatically received at a timing set beforehand to acquire and save (record) broadcasting information (still images, letters, and motion image contents), and saved (recorded) motion image contents are repeatedly displayed on a standby screen of the mobile terminal or displayed for a certain period.

Patent Literature 1 also discloses that when normal contents cannot be acquired because of a poor radio wave condition at the time of acquiring broadcasting information, broadcasting information recorded previously is used or contents are acquired again after the radio wave condition becomes good. Furthermore, Patent Literature 1 discloses that when there is no operation by a user for longer than or equal to a set period, updating of a standby screen set by the user is terminated and contents to be displayed on the standby screen is downloaded from a specific server.

Patent Literature 1: Unexamined Japanese Patent Application KOKAI Publication No. 2005-277867

DISCLOSURE OF INVENTION

Problem to be Solved by the Invention

TV viewers often keep turning on a TV receiver in their home. It is one of features of TV that a viewer is enabled to always watch any program in real time.

TV viewers having a habit of being enabled to always watch a TV program in real time in their home are likely to be in a condition that they are enabled to watch an on-air TV program in real time also using a cellular phone (mobile terminal) or the like having a TV function.

Patent Literature 1 discloses that broadcasting information saved beforehand or downloaded contents are reproduced and displayed on a standby screen of the mobile terminal. However, for TV viewers, it is suitable to display an always-in-receiving TV program on the standby screen in real time from the standpoint of promotion of watching of a TV broadcasting rather than to reproduce and display a saved broadcasting information.

However, in a TV receiving operation, because it is necessary to execute a process of synchronizing with a received radio wave, etc., there is a TV-display blank period that a TV broadcasting cannot be received well for a certain period (from about 4 to greater than or equal to about 10 seconds in the case of One Seg broadcasting) once the TV receiving operation starts. Accordingly, a user cannot watch TV well during such a blank period and gets frustrated, so that it is not good from the standpoint of promotion of watching. In order to avoid such a problem, it is necessary to always turn on a TV tuner or the like and to keep always operating a receiving system, but this results in wasted power consumption in the case of mobile terminals using a battery, so that it is not practical.

The present invention has been made in view of the foregoing circumstances, and it is an object of the present invention to provide a standby screen display method, a mobile terminal, and a control program which promote utilization of a TV broadcasting using the mobile terminal.

Means for Solving the Problem

To achieve the object, a method of displaying a standby screen which is displayed when a mobile terminal with a TV receiver is in a standby condition according to a first aspect of the present invention comprises activating the TV receiver at a time of a transition to the standby condition, synthesizing data of standby screen stored beforehand with data of a predetermined image, displaying the synthesized image, and switching, at a predetermined timing, the predetermined image in the synthesized image to a real-time TV image received by the TV receiver.

A mobile terminal with a TV receiver according to a second aspect of the present invention comprises: image storing means which stores data on a standby screen to be displayed at a time of a standby condition, and data on a predetermined image; image synthesizing/displaying means which activates the TV receiver at a time of a transition to a standby condition, synthesizes data on the standby screen with data on the predetermined image both stored in the image storing means, and displays the synthesized image; and display control means which switches the predetermined image in the synthesized image to a real-time TV image received by the TV receiver.

A control program for a mobile terminal with a TV receiver according to a third aspect of the present invention allows the mobile terminal to function as: image storing means which stores data on a standby screen to be displayed at a time of a standby condition, and data on a predetermined image; image synthesizing/displaying means which activates the TV receiver at a time of a transition to a standby condition, synthesizes data on the standby screen with data on the predetermined image both stored in the image storing means, and displays the synthesized image; and display control means which switches the predetermined image in the synthesized image to a real-time TV image received by the TV receiver.

Effect of the Invention

According to the present invention, an image is displayed without any blank period at the time of switching to a standby condition, thereby promoting utilization of a TV broadcasting.

Figure 1A:
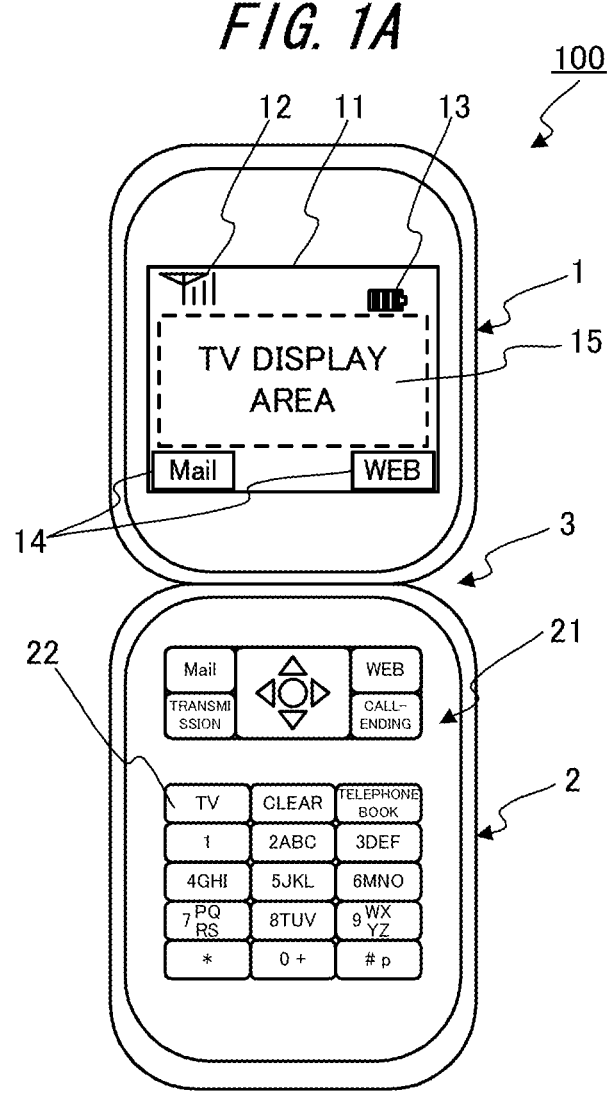
FIG. 1A is a diagram showing the external appearance of a mobile terminal according to a first embodiment of the present invention.

| Description of Reference Numerals | |
|---|---|
| 100 | Mobile terminal |
| 1 | Upper casing |
| 11 | Display unit |
| 12 | Radio wave condition display |
| 13 | Remaining battery level display |
| 14 | Display icon |
| 15 | TV display area |
| 2 | Lower casing |
| 21 | Input button |
| 22 | TV button |
| 3 | Hinge |
| 41 | TV tuner |
| 42 | Communication unit |
| 43 | Operating unit |
| 44 | Display unit |
| 45 | Memory |
| 451 | ROM |
| 452 | RAM |
| 46 | CPU |
| 50 | Control unit |
| 51 | Storing/reproducing unit |
| 52 | Display control unit |
| 53 | Standby screen data |
| 54 | Image data |
| 55 | Recorded data |
| 56 | Downloaded data |
| 57 | Preset data |
| 58 | Setting information |

BEST MODE FOR CARRYING OUT THE INVENTION

Explanation for Configurations

Embodiments of a standby screen display method, a mobile terminal, and a control program of the present invention will be explained in detail.

First Embodiment

Figure 1B:
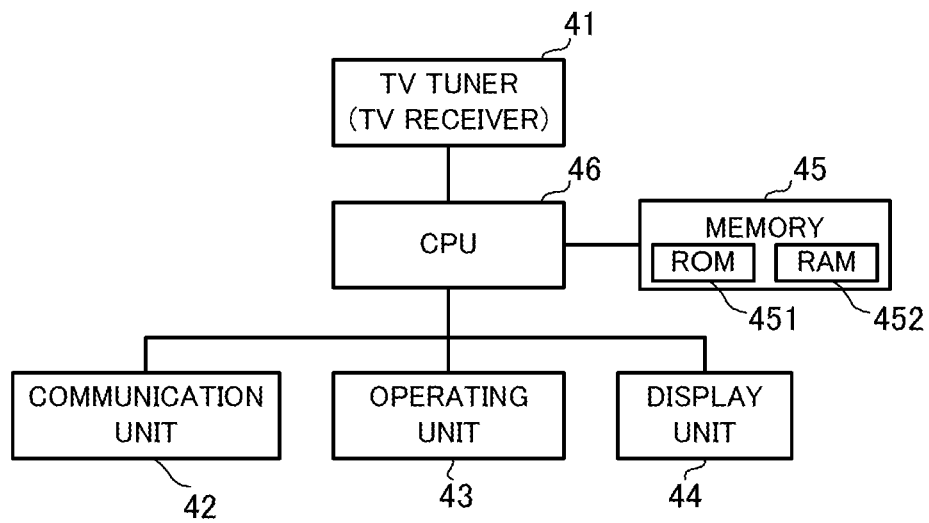
FIG. 1B is a diagram showing the device configuration of a mobile terminal according to a first embodiment of the present invention.

FIG. 1 roughly shows a mobile terminal 100 according to the first embodiment of the present invention. FIG. 1A is a diagram showing the external appearance of the mobile terminal 100. FIG. 1B is a diagram showing the device configuration of the mobile terminal 100.

As shown in FIG. 1A, the mobile terminal 100 is a foldable-type mobile terminal, comprises an upper casing 1, a lower casing 2, and a hinge 3, and is configured in such a way that the upper casing 1 and the lower casing 2 are foldable via the hinge 3.

The upper casing 1 has a display unit 11 like a liquid crystal panel formed on a front face. The lower casing 2 has input buttons 21 for various input operations formed on a front face.

As shown in FIG. 1A, the display unit 11 of the upper casing 1 displays a radio wave condition display 12 indicating a communication condition of a received radio wave, a remaining battery level display 13 indicating a remaining battery level, and display icons 14 for launching various applications (functions), such as a mail, and a Web.

The display unit 11 also displays a screen (standby screen) indicating a status when in a status (standby status) that reception of a telephone or a mail is awaited from a communication counterparty. The standby screen is provided with a TV display area 15 which displays images, such as a real-time TV image, a recorded TV image, downloaded contents, and preset contents.

FIG. 1B shows the device configuration of the mobile terminal 100. The mobile terminal 100 includes a TV tuner 41 which receives a TV broadcasting, a memory 45 which saves various image data and setting information for controlling of recording, displaying, and the like, a communication unit 42, an operating unit 43, a display unit 44, and a CPU (Central Processing Unit) 46.

The TV tuner (TV receiver) 41 receives radio wave signals of terrestrial digital One Seg broadcastings (One Seg broadcastings) and analog broadcastings transmitted from television broadcasting stations, decodes the received radio wave signals into sound data and image data (TV image), and output those pieces of data. The TV tuner (TV receiver) 41 is activated as, for example, the power is on. A preparation such as synchronization with the received radio wave signal is requisite in order to cause the TV tuner 41 to output a TV image which can be displayed well, so that it takes several seconds after activation. The TV tuner 41 stores status information indicating the status (quality) of the TV image being output.

The communication unit 42 has a function of registering a position to a base station, a wireless communication like a communication with a communication counterparty terminal, and a function of downloading predetermined contents from a predetermined website via the Internet.

The operating unit 43 is the key input unit or the like of the mobile terminal 100, and includes a TV button 22 for activating the TV function, and the input buttons 21, such as various function keys and ten keys. The display unit 44 includes a display panel like an LCD (Liquid Crystal Display), and displays various setting screens, standby screens, and TV image screens.

The memory 45 comprises a ROM (Read Only Memory) 451 and a RAM (Random Access Memory) 452, and serves as a memory area for the mobile terminal 100. The ROM 451 stores a control program or the like. The RAM 452 can be a nonvolatile RAM, and stores various setting information and image data (standby screen data, recorded data, preset data), such as standby screens, TV images, download contents, and preset contents. Note that data indicating a received radio wave condition and a remaining battery level is detected by a non-illustrated detecting unit, and is always overwritten and saved in the RAM 452 through the CPU 46.

The CPU 46 reads out the control program stored in the ROM 451, and executes the read-out control program, thereby controlling the foregoing individual units (the TV tuner 41, the communication unit 42, the operating unit 43, the display unit 44, and the memory 45), and realizing the functions (processes) of the embodiment to be discussed later.

Figure 2:
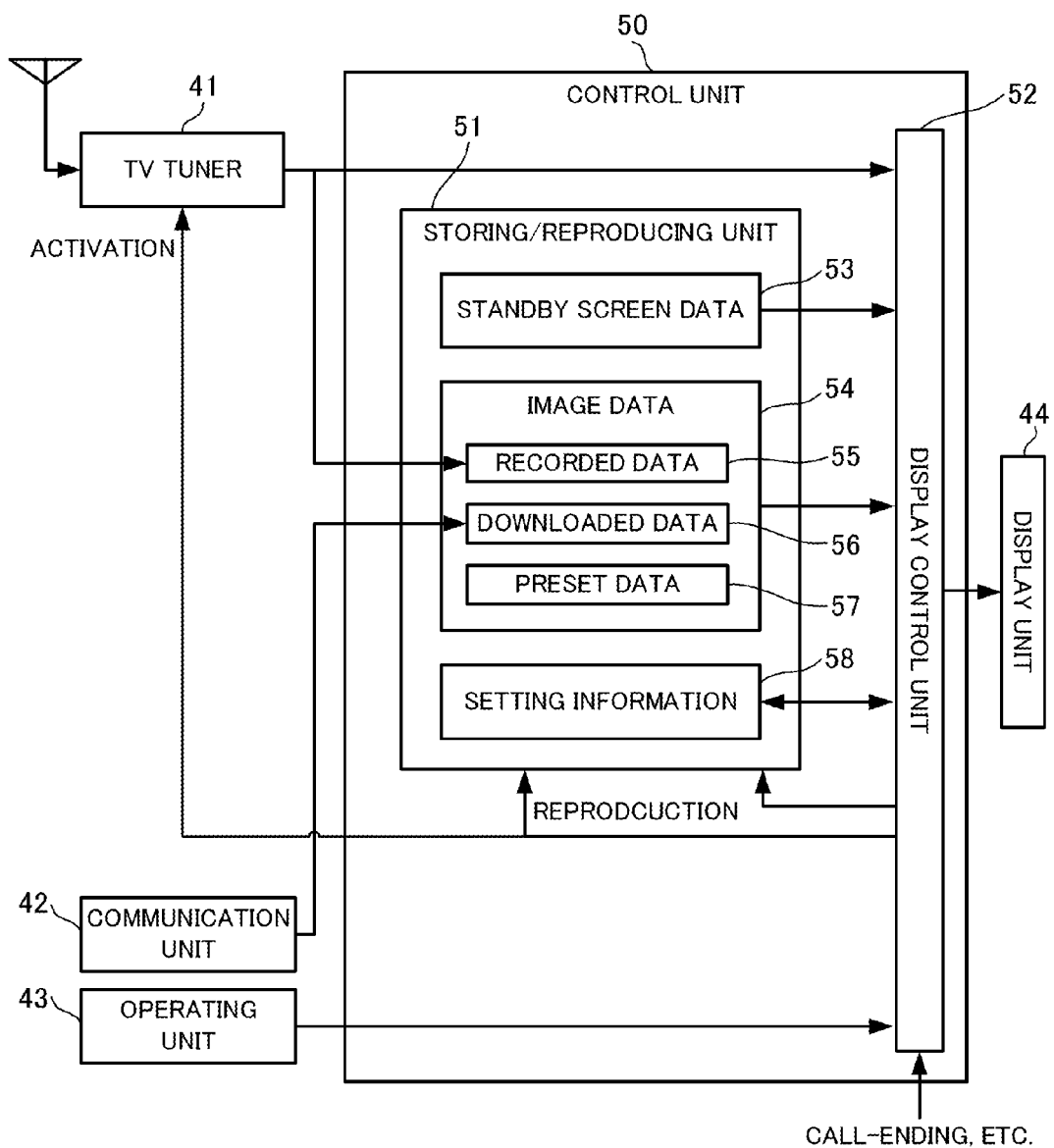
FIG. 2 is a functional block diagram relating to a display control by the mobile terminal.

FIG. 2 is a functional block diagram relating to a display control by the mobile terminal 100.

A control unit 50 can be realized by the CPU 46 and the memory 45. The control unit 50 includes a storing/reproducing unit 51, and a display control unit 52.

The storing/reproducing unit 51 stores standby screen data 53 and image data 54, and reproduces (displays) those pieces of data 53, 54 on the display unit 44. The storing/reproducing unit 51 also stores various setting information 58 for storing and reproducing image data.

Note that the image data 54 comprises recorded data 55, downloaded data 56, and preset data 57. The recorded data 55 is data that a TV image received by the TV tuner 41 is recorded. The downloaded data 56 is data (contents) of images that the communication unit 42 downloads from a predetermined website via the Internet. The preset data 57 is predetermined image data stored in the mobile terminal 100 beforehand.

Next, an explanation will be given of various setting indicated by the setting information 58 stored in the storing/reproducing unit 51.

Figure 3A:
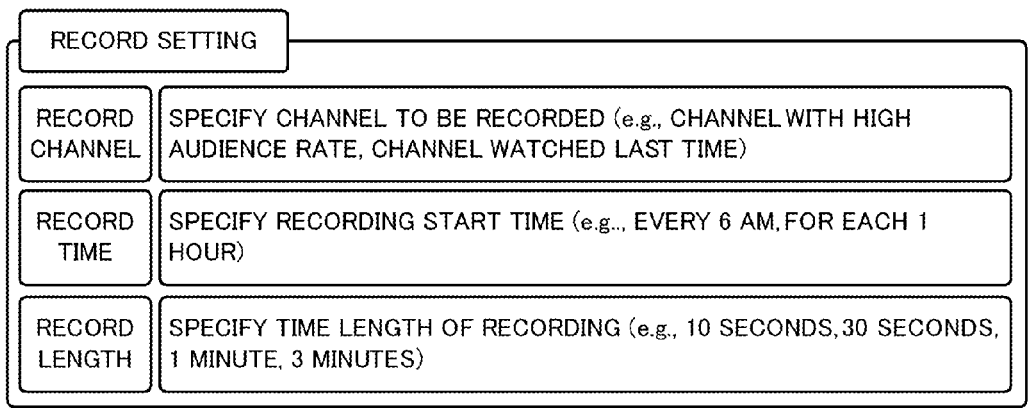
FIG. 3A is a diagram showing setting items for recording.
Figure 3B:
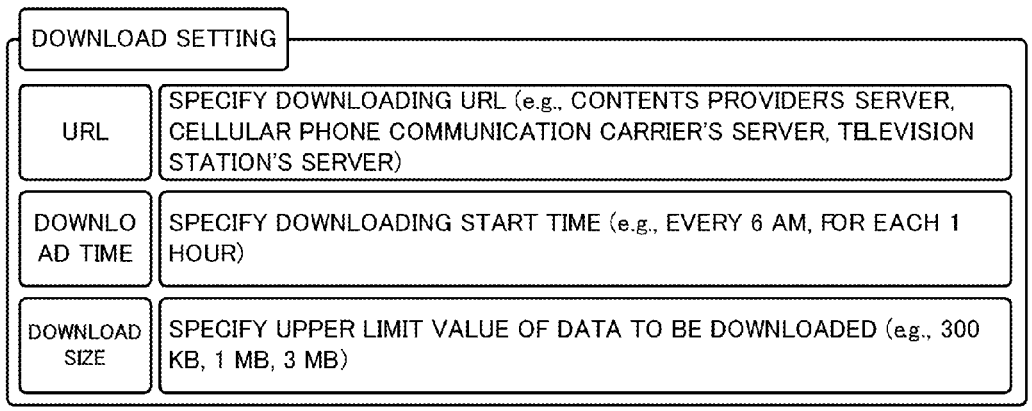
FIG. 3B is a diagram showing setting items for downloading.

FIG. 3A is a diagram showing setting items for recording, and FIG. 3B is a diagram showing setting items for downloading. FIG. 3A and FIG. 3B show setting items for setting relating to acquiring method of the image data 54 (recorded data 55, downloaded data 56) to be displayed during a blank period which occurs during a transition to a standby screen and which cannot display a TV image in real time.

As shown in FIG. 3A, the setting items for recording include an item (record channel) for setting a TV channel that a TV image is recorded, an item (record time) for setting a time when recording is started, and an item (record length) for setting the time length of recording.

It is possible to directly set a TV channel like "CH 1" for the "record channel", or a "TV channel with a high audience rate", a "TV channel watched last time" or the like can be set. It is possible to set, for example, "every 6 AM", "for each one hour", or the like for the "record time". Furthermore, it is possible to set, for example, "10 seconds", "30 seconds", "one minute", "three minutes" or the like for the "record length".

A process of recording a TV image performed based on the above-described record setting can be executed as a background process of the mobile terminal 100 as the display control unit 52 controls the TV tuner 41 and the storing/reproducing unit 51.

As shown in FIG. 3B, the setting items for downloading include an item (URL) for setting a URL where data (contents) to be downloaded is stored, an item (download time) for setting a time when downloading is started, and an item (download size) for setting the upper limit value of the size of data (contents) to be downloaded. It is possible to set a URL to access, for example, "contents provider server", "cellular phone communication carrier's server", "television station's server", or the like for the "URL". It is possible to set, for example, "every 6 AM", "for each one hour", or the like for the "download time". Furthermore, it is possible to set, for example, "300 KB", "1 MB", "3 MB", or the like for the "download size".

A process of downloading data (contents) executed based on the above-explained downloading setting can be executed as a background process of the mobile terminal 100 as the display control unit 52 controls the communication unit 42 and the storing/reproducing unit 51.

Figure 4A:
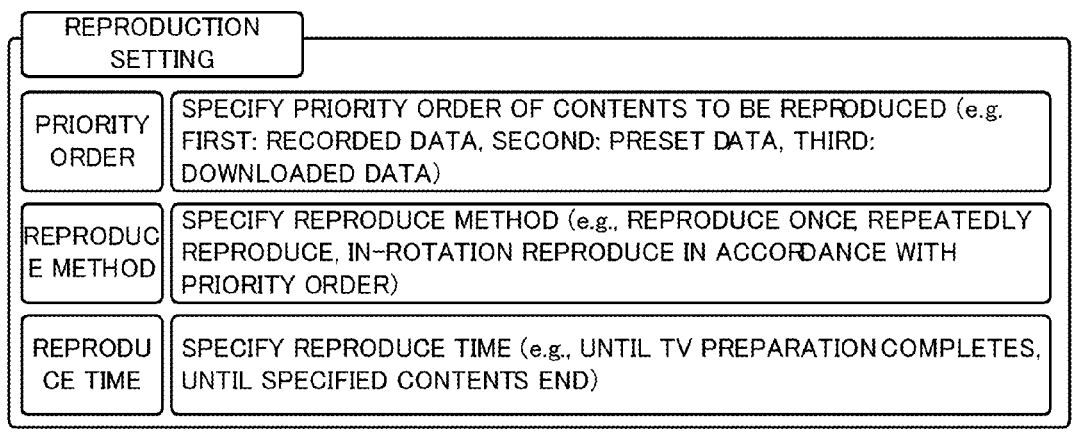
FIG. 4A is a diagram showing setting items for reproduction.

FIG. 4A is a diagram showing setting items for reproduction of the image data 54 to be reproduced (displayed) on the TV display area 15 in a standby condition.

The setting items for reproduction include an item (priority order) for setting a priority order of the image data 54 to be reproduced (displayed), an item (reproduce method) for setting the reproduce method, and an item (reproduce time) for setting a reproduce time. The "priority order" can be set by adding an order like "first: recorded data 55, second: downloaded data 56, third: preset data 57" to the recorded data 55, the downloaded data 56, and the preset data 57. Based on the priority order, the image data 54 to be displayed on the TV display area 15 at the time of standby condition is determined. It is possible to select (set) any one of, for example, "reproduce once" "repeatedly reproduce", "in-rotation reproduce in accordance with a preset priority order" for the "reproduce method". Furthermore, it is possible to set, for example, "until preparation of TV display completes", "until specified contents end", or the like for the "reproduce time".

Figure 4B:
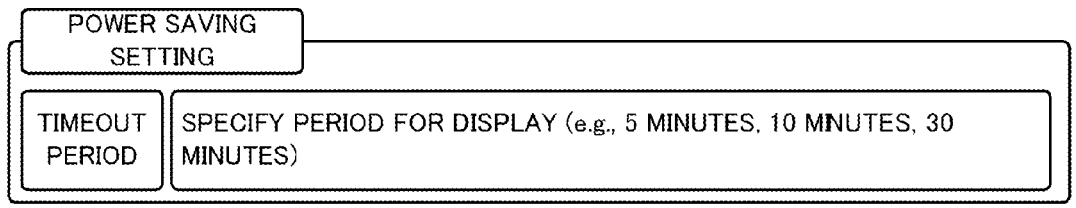
FIG. 4B is a diagram showing setting item for power saving.

FIG. 4B is a diagram showing a setting item for power saving.

The setting item for power saving includes an item (timeout period) for setting a time (timeout period) of displaying a real-time TV image displayed on the TV display area 15 at the time of standby condition. The shorter the timeout period is set, the shorter the display period of displaying a real-time TV image at the time of standby condition becomes, so that the time that the TV tuner 41 is being turned on becomes short, thereby saving power. It is possible to set, for example, "five minutes", "10 minutes", "30 minutes", or the like for the "timeout period".

Returning to FIG. 2, the display control unit 52 controls the TV tuner 41 and the storing/reproducing unit 51 in response to a transition to a standby condition of the mobile terminal 100 through a call-ending operation, an opening operation of the upper and lower casings 1, 2, and the like, and displays a real-time TV image or the image data 54 (the recorded data 55, the downloaded data 56, the preset data 57) on the TV display area 15 based on the setting information 58.

Explanation for Operation

Operations of the mobile terminal 100 will be explained in detail.

Setting Information Registering Process

First, an explanation will be given of a process (setting information registering process) that a user registers the setting information 58.

The use manipulates the operating unit 43 of the mobile terminal, and sets the setting information 58 shown in FIGS. 3 and 4. For example, the user displays a setting screen on the display unit 44, manipulates the operating unit 43, and inputs the setting information 58 on the setting screen. Hereinafter, an explanation will be given of each of the following processes based on an assumption that, for the record setting, "CH 1" is set for the "record channel", "every 6 AM" is set for the "record time", and "10 seconds" is set for the "record length". For reproduce setting, "first: recorded data, second: preset data, third downloaded data" is set for the "priority order", "repeatedly reproduce" is set for "reproduce method", and "until preparation for TV display completes" is set for the "reproduce time". Furthermore, for power saving setting, "five minutes" is set for the "timeout period".

Subsequently, the display control unit 52 stores those pieces of information by the user as the setting information 58 in the storing/reproducing unit 51. Note that the preset data 57 is stored in the memory 45 beforehand.

Recorded Data Acquiring Process

Next, an explanation will be given of a process (recorded data acquiring process) of acquiring the recorded data 55 based on the "record setting" registered through the foregoing setting information registering process.

Figure 5:
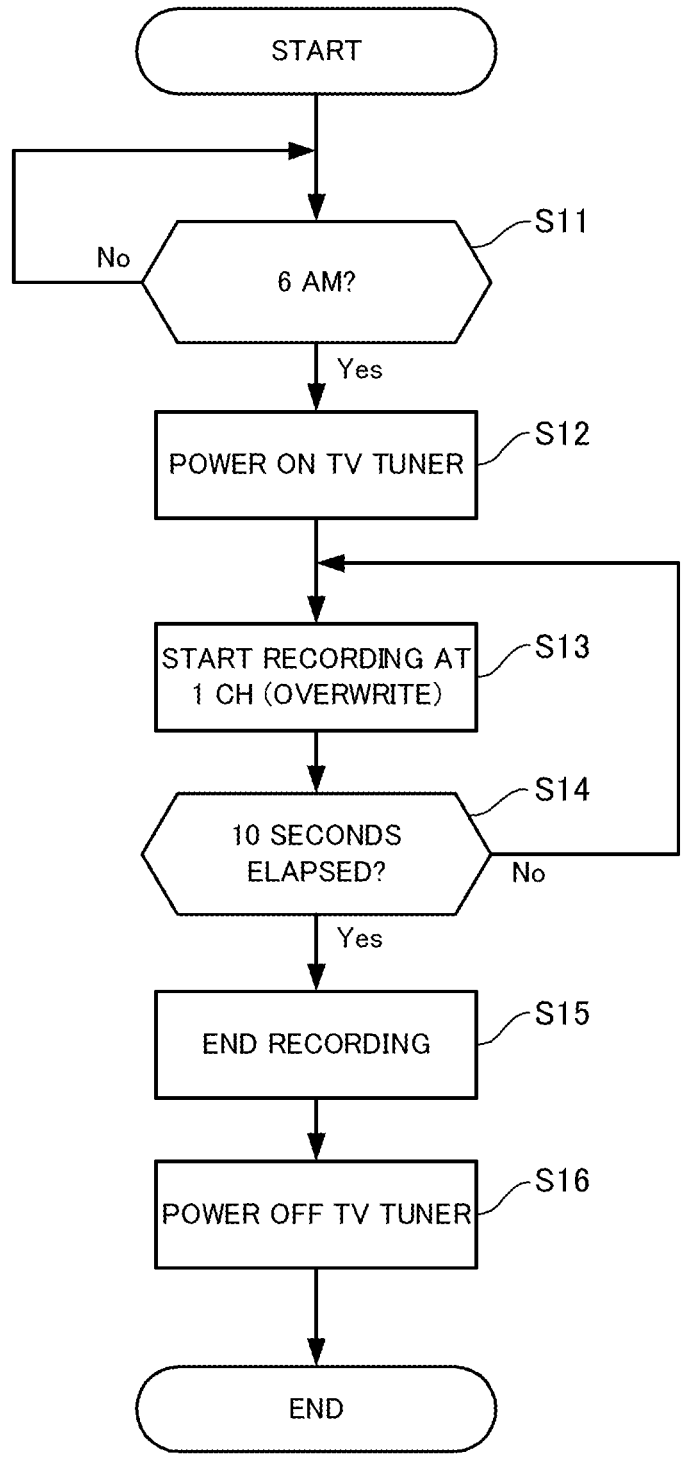
FIG. 5 is a flowchart of a recorded data acquiring process.

FIG. 5 is a flowchart showing the recorded data acquiring process. Note that the recorded data acquiring process is executed as a background process of the mobile terminal 100.

The display control unit 52 monitors a current time, and when a current time reaches a time (6 AM) set in the "record time" in the record setting (step S11: YES), the TV tuner 41 is activated (step S12).

Next, the display control unit 52 controls the storing/reproducing unit 51, and starts recording of a TV broadcasting at the "1 CH" set in the "TV channel" in the record setting (step S13). Note that when there is recorded data 55 acquired through a previous recorded data acquiring process, this recorded data 55 is overwritten and recorded.

Subsequently, the display control unit 52 determines whether or not a time ("10 seconds") set in the "record length" in the record setting elapses from the start of recording (step S14), when it does not elapse (step S14: NO), the recording is continued (step S13), and when 10 seconds elapse (step S14: YES), the recording operation is terminated (step S15).

Thereafter, the display control unit 52 changes the condition of the power of the TV tuner 41 to be an off condition (step S16). The recorded data acquiring process is then completes.

Through the foregoing operation, a TV image at the channel 1 recorded for 10 seconds from 6 AM is overwritten and saved in the mobile terminal 100 every morning.

Standby Screen Display Process

Next, an explanation will be given of a standby screen display process of displaying a standby screen when the mobile terminal 100 is in a standby condition.

Figure 6:
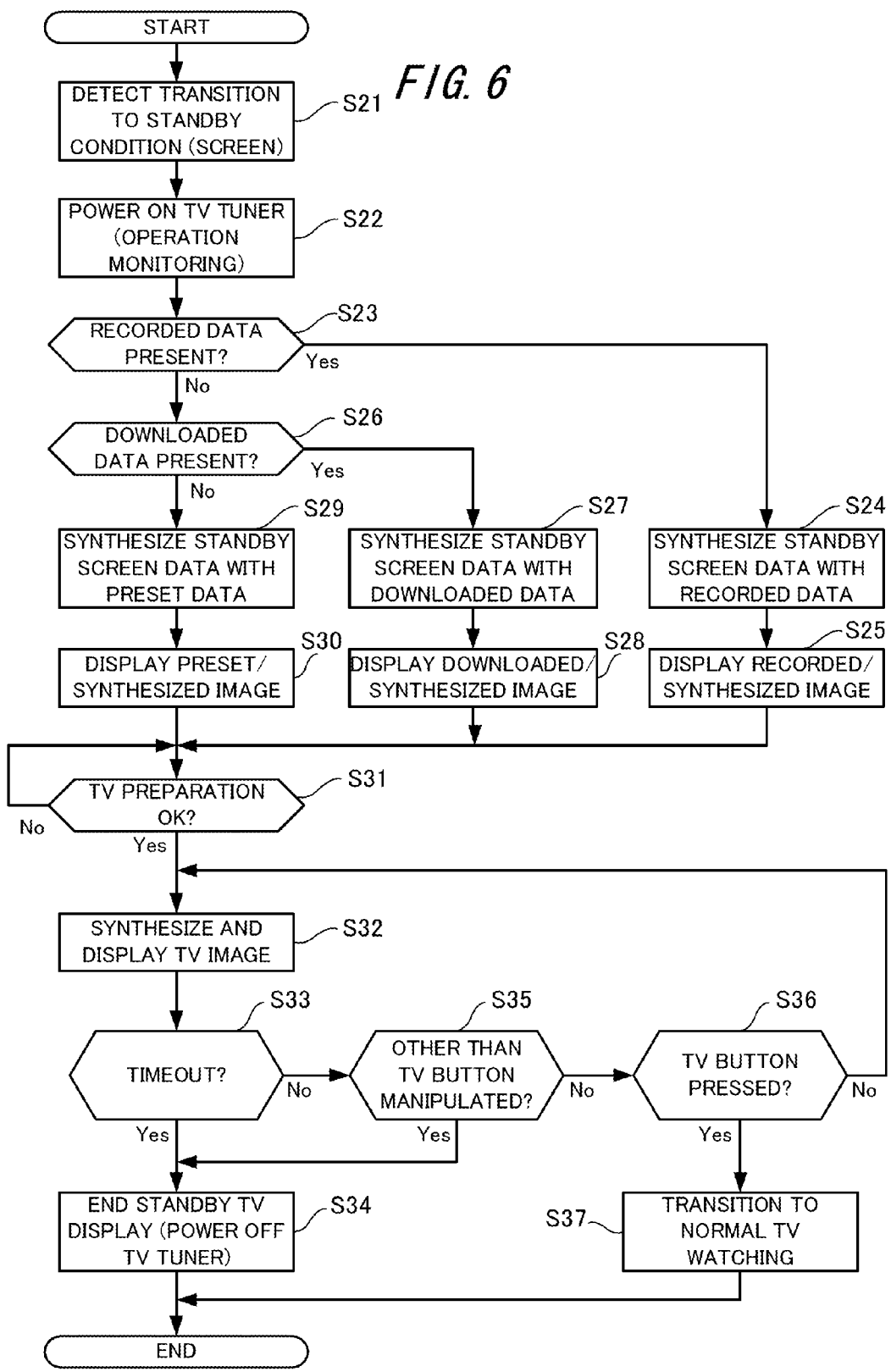
FIG. 6 is a flowchart of a standby screen display process.

FIG. 6 is a flowchart of the standby screen display process.

When the operation of any function (application) is terminated over the mobile terminal 100 as a call-ending key is pressed for example, or when the mobile terminal 100 is recovered from a power-saving condition as the mobile terminal 100 is opened from a folded condition, a transition to the standby condition (screen) of the mobile terminal 100 is initiated.

As the display control unit 52 of the mobile terminal detects the transition to the standby condition (screen), (step S21), the display control unit 52 turns on the TV tuner 41, and monitors status information indicating a status (quality) of a TV image being output by the TV tuner 41 (step S22).

Next, the display control unit 52 determines whether or not there is the recorded data 55 in the storing/reproducing unit 51 (step S23).

When there is the recorded data 55 (step S23: YES), the display control unit 52 synthesizes the standby screen data 53 with the image of the recorded data 55 (synthesize the recorded data 55 at the TV display area 15) (step S24). Thereafter, the display control unit 52 displays the synthesized image (recorded/synthesized image) on the display unit 44 (step S25).

When there is no recorded data (step S23: NO), the display control unit 52 determines whether or not there is the downloaded data 56 in the storing/reproducing unit 51 (step S26).

When there is the downloaded data 56 (step S26: YES), the display control unit 52 synthesizes the standby screen data 53 with the image of the downloaded data 56 (synthesizes the downloaded data 56 at the TV display area 15) (step S27). Thereafter, the display control unit 52 displays the synthesized image (downloaded/synthesized image) on the display unit 44 (step S28).

When there is no downloaded data 56 (step S26: NO), the display control unit 52 synthesizes the standby screen data 53 with the image of the preset data 57 (synthesizes the preset data 57 at the TV display area 15) (step S29). Thereafter, the display control unit 52 displays the synthesized image (preset/synthesized image) on the display unit 44 (step S30).

Next, the display control unit 52 refers to the status information of the TV tuner 41, thereby determining whether or not a preparation for displaying a TV image completes (step S31). When the preparation for displaying a TV image does not complete (step S31: NO), the process stands by, and current displaying of the standby screen is continuously kept. When the preparation for displaying a TV image completes (step S31: YES), the display control unit 52 stop reproducing the image data 54 (any one of the recorded data 55, the downloaded data 56, and the preset data 57) which is being displayed on the TV display area 15, synthesizes the standby screen with a real-time TV image output by the TV tuner 41 (synthesizes the TV image at the TV display area 15) instead of the image of the image data 54, and displays the synthesized image (TV image synthesized image) on the display unit 44 (step S32).

Subsequently, the display control unit 52 determines whether or not "five minutes" set for the "timeout period" in the power saving setting has elapsed (step S33). When the time out period has elapsed (step S33: YES), the TV image displayed on the TV display area 15 is turned off, and the TV tuner 41 is powered off (step S34).

Moreover, before the timeout period elapses (step S33: NO), when the user manipulates a key button other than the TV button 22 (step S35: YES), the display control unit 52 turns off the TV image displayed on the TV display area 15, powers off the TV tuner 41, and changes the display of the display unit 44 to a screen corresponding to the manipulation of the user (step S34).

Furthermore, before the timeout period elapses (step S33: NO), when the user manipulates the TV button 22 (step S36: YES), the display control unit 52 turns off the TV image displayed on the TV display area 15, launches an application for watching TV, and keeps displaying the currently-displayed TV image of a channel (CH 1) on a screen on the application (step S37).

When there is no manipulation like pressing of a button in the steps S35, S36, the process returns to the step S32, and the display control unit 52 keeps displaying the standby screen having the TV display area 15 on which a TV image is being displayed.

As explained above, according to the embodiment, when a transition to a standby condition occurs as the user presses a call-ending key, etc., the display control unit 52 generates a standby screen having the TV display area 15 where any of the recorded data 55, the downloaded data 56, and the preset data 57 is displayed, and displays the generated standby screen on the display unit 44. When the preparation of the TV tuner 41 for displaying a TV image completes, an image to be displayed on the TV display area 15 is switched to a real-time TV image. Thereafter, as the user presses a button other than the TV button 22 before the timeout period elapses, the display control unit 52 ends displaying at the TV display area 15, and when the user presses the TV button 22, the display control unit 52 switches a screen from the standby screen to a normal screen for watching TV in real time under the control of an application for watching TV.

Therefore, according to the embodiment, when a transition to a standby screen occurs, first, any of the recorded data 55, the downloaded data 56, and the preset data 57 is reproduced, reproduction of any of those data 55, 56, 57 is terminated after a preparation for watching TV completes, and then the user is allowed to start watching TV. Accordingly, while the receiving condition of a radio wave signal by the TV tuner 41 becomes stable, i.e., when it is difficult to display a good TV image, as any of the recorded data 55, the downloaded data 56, and the preset data 57 is reproduced, TV image contents can be displayed quickly while a standby screen is being displayed, thereby promoting TV watching.

According to the embodiment, the recorded data 55, the downloaded data 56 or the like is displayed at the time of a transition to a standby screen. Accordingly, it is expected that the user will activate the TV function (TV watching application) of the mobile terminal 100 in order to watch a TV program related to the displayed data 55, 56, so that it is possible to promote the user to increase the number of opportunities of watching TV. Moreover, if user's attention is attained by, for example, updating the downloaded data 56 day by day at the server (e.g., a contents providers server) which is a download originator of the downloaded data 56, the foregoing effect can be further expected.

According to the embodiment, the recorded data 55, the downloaded data 56 or the preset data 57 is reproduced during a period (blank period) that TV watching is unable because of a preparation right after a transition to a standby screen, so that the user can utilize a time efficiently, and a screen (blank screen) that no image is displayed can be eliminated, thereby reducing the frustration of the user.

Furthermore, according to the embodiment, as recording or downloading is performed periodically through a background process, contents (the recorded data 55, the downloaded data 56) to be displayed during a preparation for TV watching can be updated while at the same time saving power consumption.

Second Embodiment

In the first embodiment, switching of a TV image to be displayed on the TV display area 15 in the standby screen is controlled in such a manner as to be performed at a time when a preparation for displaying a TV image completes. In contrast, according to the second embodiment, the timing of the switching is set to a time when reproduction of the recorded data 55, the downloaded data 56, or the preset data 57 ends.

The second embodiment is realized by setting "until a specified contents ends" for the "reproduce time" in the reproduce setting. The device configuration of the mobile terminal 100 of the embodiment and the functional configuration thereof are same as the configurations shown in FIG. 1B and FIG. 2, respectively.

Figure 7:
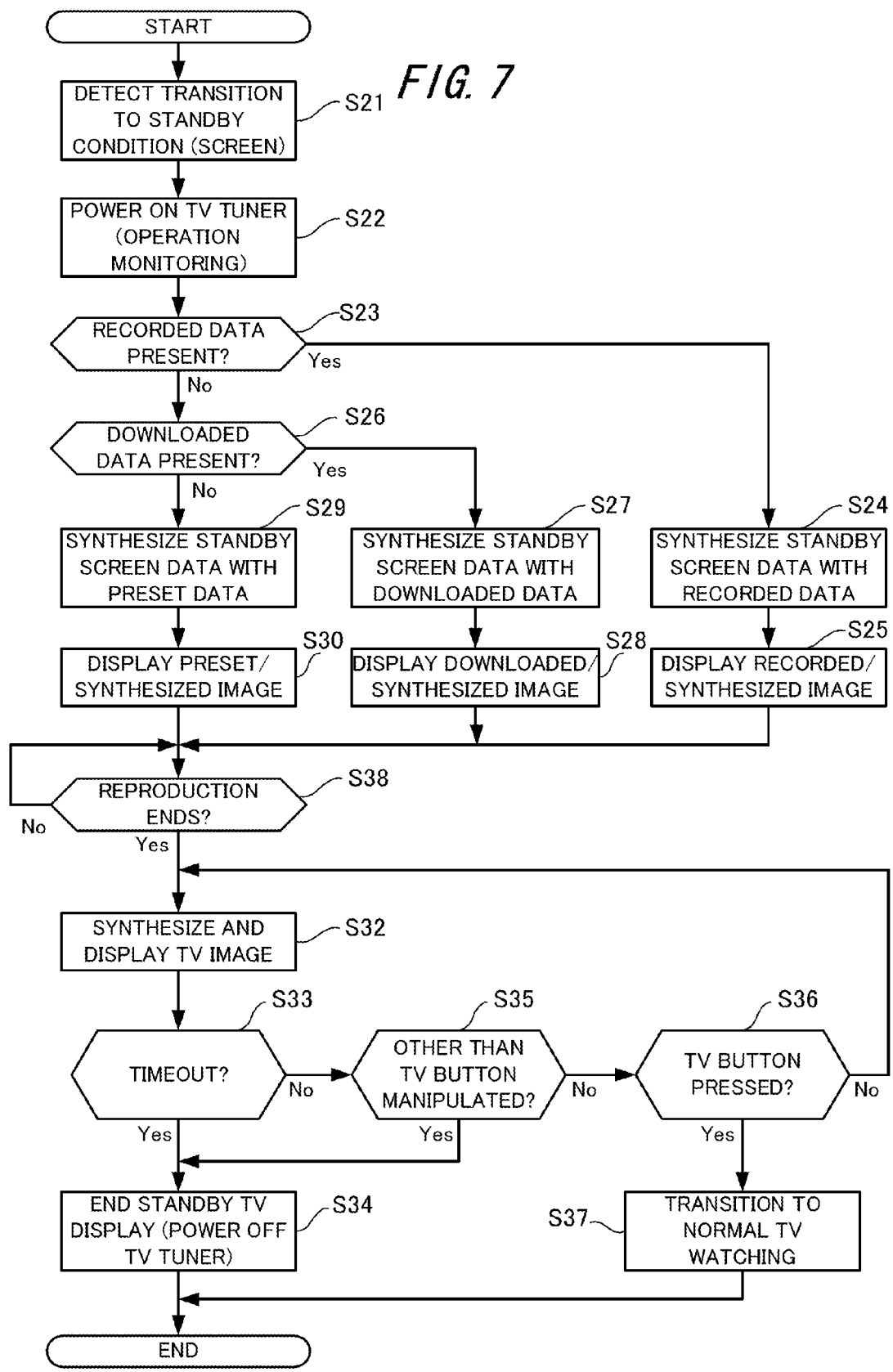
FIG. 7 is a flowchart of a standby screen display process by a mobile terminal according to a second embodiment of the present invention.

FIG. 7 is a flowchart showing a standby screen display process by the mobile terminal 100 of the second embodiment. This flowchart has the step S31 in the flowchart of FIG. 6 replaced with a step S38 in which it is determined whether or not reproduction of the image data 54 (the recorded data 55, the downloaded data 56, or the preset data 57) ends. The processes at individual steps other than the step S38 are substantially same as those at individual steps in the flowchart of FIG. 6.

Third Embodiment

In the foregoing embodiments, the explanation has been given of the example configurations that the timing of displaying a real-time TV image on the TV display area 15 of the standby screen is set to a timing when a preparation for TV display completes or a timing when reproduction of the image data 54 ends. In contrast, according to the third embodiment, such switching is performed by a button manipulation or the like by the user after a predetermined time elapses from a transition to the standby screen in the third embodiment.

The mobile terminal 100 of the third embodiment has the same device configuration as one shown in FIG. 1B, and comprises the TV tuner 41, the memory 45 including the ROM 451 and the RAM 452, the communication unit 42, the operating unit 43, the display unit 44, and the CPU (Central Processing Unit) 46. The CPU 46 reads out the control program stored in the ROM 451, and executes the read-out control program, thereby controlling individual units to realize the functions of the third embodiment to be discussed below.

Figure 8:
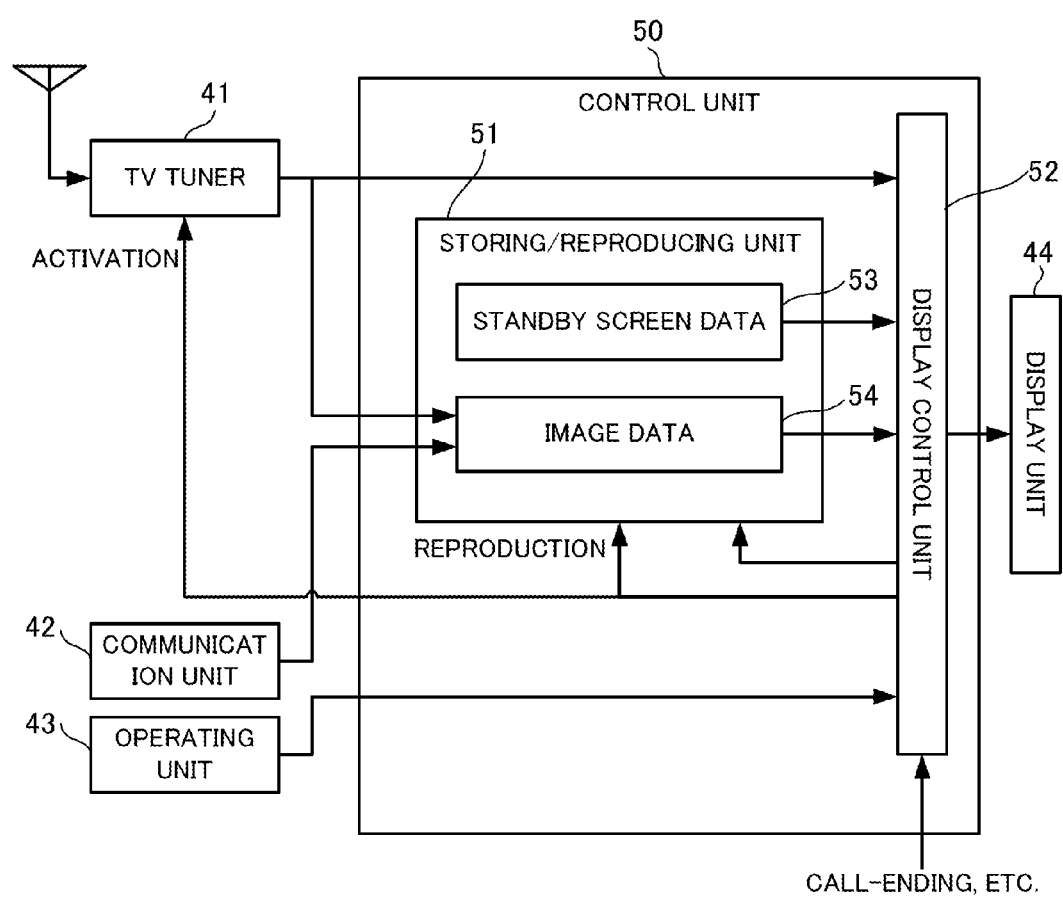
FIG. 8 is a functional block diagram relating to a display control by a mobile terminal according to a third embodiment of the present invention.

FIG. 8 is a functional block diagram relating to a display control by the mobile terminal 100 of the third embodiment. The control unit 50 includes the storing/reproducing unit 51 which stores and reproduces the standby screen data 53 and the image data 54, and the display control unit 52 which controls displaying of the standby screen.

The storing/reproducing unit 51 has a function of storing and reproducing at least the standby screen data 53 and the image data 54 to be synthesized with the standby screen. The image data 54 includes recorded data, and downloaded data or preset data as needed.

The display control unit 52 inputs information on call-ending, such as a transition to the standby screen and operational information from the operating unit 43, controls the TV tuner 41 and the storing/reproducing unit 51, and performs controlling, such as storing of the image data or synthesizing and displaying of the standby screen with the stored image.

In particular, relating to a control for reproduction and displaying, the display control unit 52 has a function of inputting reproduced standby screen data and image data, synthesizing the image with the standby screen, and outputting the synthesized image to the display unit 44, a function of switching synthesis of reproduced data with the standby screen to a real-time TV image after a certain time elapses by a time monitoring or by an input manipulation by the user and outputting the real-time TV image to the display unit 44, and a function of terminating synthesis of the TV image with the standby screen by a button manipulation or the like, and changing an operation to displaying in accordance with the manipulation.

Figure 9:
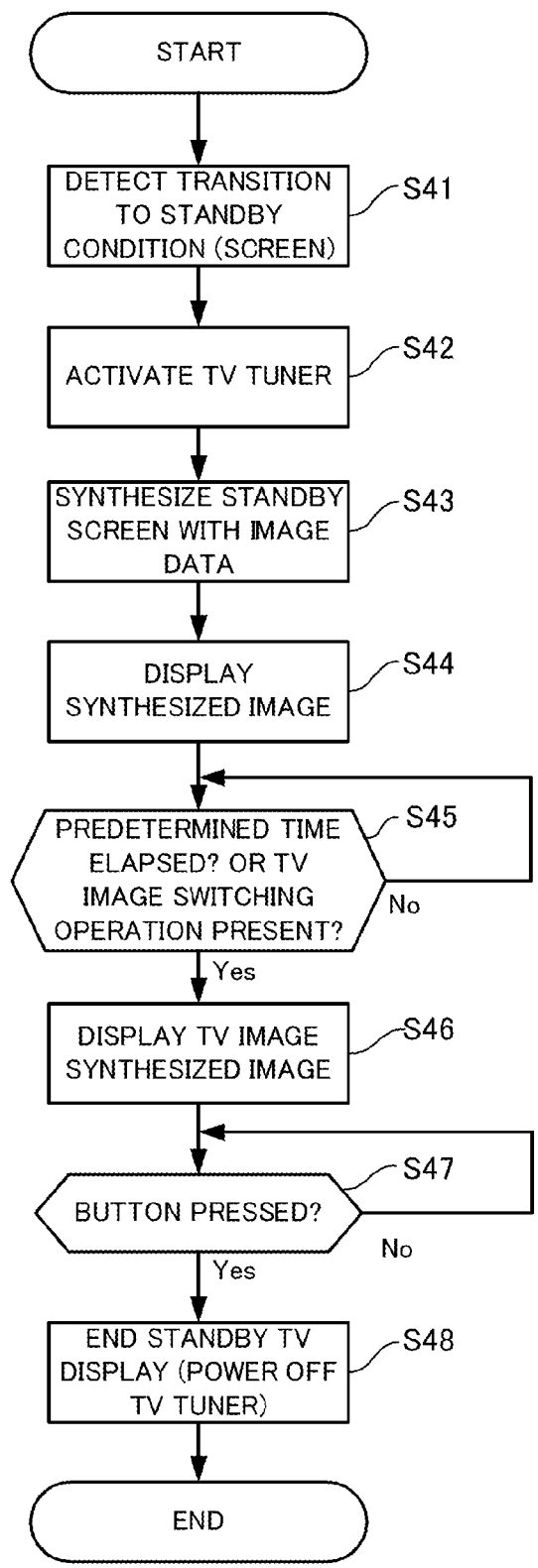
FIG. 9 is a flowchart of a standby screen display process by the mobile terminal according to the third embodiment of the present invention.

FIG. 9 is a flowchart showing a standby screen display process by the mobile terminal 100 of the third embodiment.

As the display control unit 52 of the mobile terminal 100 detects a transition to the standby condition (screen) (step S41), the display control unit 52 activates the TV tuner 41 (step S42). Next, the display control unit 52 controls the storing/reproducing unit 51, synthesizes the image data 54 with the standby screen data 53 (synthesizes the recorded data at the TV display area 15) (step S43), and displays the synthesized image on the display unit 44 (step S44). Next, the display control unit 52 determines whether or not a predetermined time has elapsed or whether or not there is a user's predetermined switching manipulation (e.g., the user presses the TV button 22) to the a TV image at the operating unit 43 (step s45). When the predetermined time has elapsed or when there is a switching operation to a TV image (step S45: YES), the display control unit 52 stop reproducing the image data 54 which is being displayed on the TV display area 15, synthesizes a real-time TV image with the standby screen (synthesizes the TV image at the TV display area 15) instead of the image of the image data 54, and displays the synthesized image (TV image synthesized image) on the display unit 44 (step S46).

Thereafter, as the display control unit 52 detects a user's button manipulation or the like for launching a predetermined application (step S47: YES), the display control unit 52 turns off the TV image displayed on the TV display area 15, powers off the TV tuner 41, and switches the display of the display unit 44 to a screen corresponding to the user's manipulation (step S48).

Through the foregoing operation, for example, as the user presses a call-ending key and a transition to the standby condition occurs, the image data 54 is once displayed on the TV display area 15, and after a predetermined time elapses or when a user's manipulation is detected, the image displayed on the TV display area 15 is switched to a real-time TV image, thereby enabling the user to watch TV through the standby screen.

The present invention is not limited to the foregoing embodiments, and can be changed and modified in various forms without departing from the scope and sprit of the present invention.

The present invention can be applied to various mobile terminals having a TV receiver, such as a information processing terminal, a PDA (Personal Digital Assistants), a One Seg mobile terminal.

INDUSTRIAL APPLICABILITY

The present invention is available on a cellular phone or the like which can display a TV image.

The invention claimed is:

1. A method of displaying a standby screen which is displayed when a mobile terminal with a TV receiver is in a standby condition, the method comprising:
immediately after activating the TV receiver at a time of a transition to the standby condition, synthesizing data of standby screen stored beforehand with data of a predetermined image, displaying the synthesized image at least until the TV receiver finishes preparing to display the TV image, and switching, at a predetermined timing, the predetermined image in the synthesized image to a real-time TV image received by the TV receiver,
wherein the mobile terminal:
stores at least one of:
data on a TV recorded image that a TV image is recorded,
data on a downloaded image downloaded from a predetermined download source, and
data on a preset image stored in the mobile terminal beforehand,
determines whether or not data on the TV recorded image is stored on the image storing unit when the TV receiver activates at a time of transition to a standby condition,
synthesizes data on the TV recorded image with data on a standby screen when data on the TV recorded image is determined to be stored,
determines whether or not data on the downloaded image is stored on the image storing unit when data on the TV recorded image is determined to not be stored,
synthesizes data on the downloaded image with data on the standby screen when data on the downloaded image is determined to be stored, and
synthesizes data on the preset image with data on the standby screen when data on the downloaded image is determined to not be stored.

2. The standby screen display method according to claim 1, wherein the predetermined timing is a timing when the TV receiver becomes able to output data of a real-time TV image.

3. The standby screen display method according to claim 1, wherein the predetermined timing is a timing when reproduction of the predetermined image ends.

4. The standby screen display method according to claim 1, wherein displaying of a real-time TV image is terminated after a predetermined time elapses from when the predetermined image is switched to the real-time TV image and the synthesized image is displayed.

5. The standby screen display method according to claim 4, wherein when a user's manipulation for watching TV in real time is detected before the predetermined time elapses, the synthesized image having a real-time TV image synthesized therewith and displayed is switched to an image for continuously watching a TV image.

6. The standby screen display method according to claim 1, wherein the transition to the standby condition occurs when a predetermined function is terminated.

7. The standby screen display method according to claim 1, wherein the transition to the standby condition occurs when the mobile terminal recovers from a power saving condition.

8. The standby screen display method according to claim 1, wherein
the method determines data on a predetermined image synthesized with the synthesized image from data on the TV recorded image, data on the downloaded image, and data on the preset image based on a priority order set beforehand.

9. The standby screen display method according to claim 8, wherein at least one of data on the TV recorded image and data on the downloaded image is acquired and saved through a periodical background process.

10. A mobile terminal with a TV receiver, comprising:
image storing unit which stores data on a standby screen to be displayed at a time of a standby condition, and data on a predetermined image;
image synthesizing/displaying unit which immediately after activating the TV receiver at a time of a transition to a standby condition, synthesizes data on the standby screen with data on the predetermined image both stored in the image storing unit, and displays the synthesized image at least until the TV receiver finishes preparing to display the TV image; and
display control unit which switches the predetermined image in the synthesized image to a real-time TV image received by the TV receiver,
wherein:
the image storing unit stores at least one of:
data on a TV recorded image that a TV image is recorded,
data on a downloaded image downloaded from a predetermined download source, and
data on a preset image stored in the mobile terminal beforehand, and the image synthesizing/displaying unit:
  determines whether or not data on the TV recorded image is stored on the image storing unit when the TV receiver activates at a time of transition to a standby condition,
  synthesizes data on the TV recorded image with data on a standby screen when data on the TV recorded image is determined to be stored,
  determines whether or not data on the downloaded image is stored on the image storing unit when data on the TV recorded image is determined to not be stored,
  synthesizes data on the downloaded image with data on the standby screen when data on the downloaded image is determined to be stored, and
  synthesizes data on the preset image with data on the standby screen when data on the downloaded image is determined to not be stored.

11. The mobile terminal according to claim 10, wherein the predetermined timing is a timing when the TV receiver becomes able to output data of a real time TV image.

12. The mobile terminal according to claim 10, wherein the predetermined timing is a timing when reproduction of the predetermined image ends.

13. The mobile terminal according to claim 10, wherein the display control unit terminates displaying of a real-time TV image after a predetermined time elapses from when the predetermined image is switched to the real-time TV image and the synthesized image is displayed.

14. The mobile terminal according to claim 13, wherein when a user's manipulation for watching TV in real time is detected before the predetermined time elapses, the display control unit switches the synthesized image having a real-time TV image synthesized therewith and displayed to an image for continuously watching a TV image.

15. The mobile terminal according to claim 10, wherein the transition to the standby condition occurs when a predetermined function is terminated.

16. The mobile terminal according to claim 10, wherein the transition to the standby condition occurs when the mobile terminal recovers from a power saving condition.

17. The mobile terminal according to claim 10, wherein
the image synthesizing/displaying unit determines data on a predetermined image synthesized with the synthesized image from data on the TV recorded image, data on the downloaded image, and data on the preset image based on a priority order set beforehand.

18. The mobile terminal according to claim 17, wherein the image storing unit acquires and stores at least one of data on the TV recorded image and data on the downloaded image through a periodical background process.

19. A non-transitory recording medium storing a control program for a mobile terminal with a TV receiver, the program allows the mobile terminal to function as:
  image storing unit which stores data on a standby screen to be displayed at a time of a standby condition, and data on a predetermined image;
  image synthesizing/displaying unit which immediately after activating the TV receiver at a time of a transition to a standby condition, synthesizes data on the standby screen with data on the predetermined image both stored in the image storing unit, and displays the synthesized image at least until the TV receiver finishes preparing to display the TV image; and
  display control unit which switches the predetermined image in the synthesized image to a real-time TV image received by the TV receiver,
wherein:
  the image storing unit stores at least one of:
    data on a TV recorded image that a TV image is recorded,
    data on a downloaded image downloaded from a predetermined download source, and
    data on a preset image stored in the mobile terminal beforehand, and
  the image synthesizing/displaying unit:
    determines whether or not data on the TV recorded image is stored on the image storing unit when the TV receiver activates at a time of transition to a standby condition,
    synthesizes data on the TV recorded image with data on a standby screen when data on the TV recorded image is determined to be stored,
    determines whether or not data on the downloaded image is stored on the image storing unit when data on the TV recorded image is determined to not be stored,
    synthesizes data on the downloaded image with data on the standby screen when data on the downloaded image is determined to be stored, and
    synthesizes data on the preset image with data on the standby screen when data on the downloaded image is determined to not be stored.

20. The recording medium according to claim 19, wherein the predetermined timing is a timing when the TV receiver becomes able to output data of a real-time TV image.

21. The recording medium according to claim 19, wherein the predetermined timing is a timing when reproduction of the predetermined image ends.

22. The recording medium according to claim 19, wherein the display control unit terminates displaying of a real-time TV image after a predetermined time elapses from when the predetermined image is switched to the real-time TV image and the synthesized image is displayed.

23. The recording medium according to claim 22, wherein when a user's manipulation for watching TV in real time is detected before the predetermined time elapses, the display control unit switches the synthesized image having a real-time TV image synthesized therewith and displayed to an image for continuously watching a TV image.

24. The recording medium according to claim 19, wherein the transition to the standby condition occurs when a predetermined function is terminated.

25. The recording medium according to claim 19, wherein the transition to the standby condition occurs when the mobile terminal recovers from a power saving condition.

26. The recoding medium according to claim 19, wherein the image synthesizing/displaying unit determines data on a predetermined image synthesized with the synthesized image from data on the TV recorded image, data on the downloaded image, and data on the preset image based on a priority order set beforehand.

27. The recording medium according to claim 26, wherein the image storing unit acquires and stores at least one of data on the TV recorded image and data on the downloaded image through a periodical background process.

28. A mobile terminal with a TV receiver, comprising:
  image storing which stores data on a standby screen to be displayed at a time of a standby condition, and data on a predetermined image;
  image synthesizing/displaying which immediately after activating the TV receiver at a time of a transition to a standby condition, synthesizes data on the standby screen with data on the predetermined image both stored in the image storing, and displays the synthesized image at least until the TV receiver finishes preparing to display the TV image; and display control which switches the predetermined image in the synthesized image to a real-time TV image received by the TV receiver, wherein:

the image storing stores at least one of:
- data on a TV recorded image that a TV image is recorded,
- data on a downloaded image downloaded from a predetermined download source, and
- data on a preset image stored in the mobile terminal beforehand, and the image synthesizing/displaying;
- determines whether or not data on the TV recorded image is stored on the image storing unit when the TV receiver activates at a time of transition to a standby condition,
- synthesizes data on the TV recorded image with data on a standby screen when data on the TV recorded image is determined to be stored,
- determines whether or not data on the downloaded image is stored on the image storing unit when data on the TV recorded image is determined to not be stored,
- synthesizes data on the downloaded image with data on the standby screen when data on the downloaded image is determined to be stored, and
- synthesizes data on the preset image with data on the standby screen when data on the downloaded image is determined to not be stored.

* * * * *